United States Patent
Han (10) Patent No.: US 8,947,540 B2
(45) Date of Patent: Feb. 3, 2015

(54) NETWORK CAMERA AND METHOD OF OPERATING STORAGE DEVICE THEREOF

(75) Inventor: Youn-sub Han, Changwon (KR)

(73) Assignee: Samsung Techwin Co., Ltd., Changwon (KR)

(*) Notice: Subject to any disclaimer, the term of this patent is extended or adjusted under 35 U.S.C. 154(b) by 612 days.

(21) Appl. No.: 13/287,557

(22) Filed: Nov. 2, 2011

(65) Prior Publication Data

US 2012/0105652 A1    May 3, 2012

(30) Foreign Application Priority Data

Nov. 2, 2010  (KR) ........................ 10-2010-0108414

(51) Int. Cl.
- *H04N 5/225* (2006.01)
- *H04N 5/765* (2006.01)
- *H04N 9/804* (2006.01)
- *G08B 13/196* (2006.01)
- *H04N 21/218* (2011.01)
- *H04N 21/2747* (2011.01)
- *H04N 21/4223* (2011.01)
- *H04N 21/637* (2011.01)
- *H04N 21/6377* (2011.01)
- *H04N 7/18* (2006.01)
- *H04N 9/82* (2006.01)

(52) U.S. Cl.
CPC .......... *H04N 5/765* (2013.01); *H04N 9/8042* (2013.01); *G08B 13/19665* (2013.01); *H04N 21/2181* (2013.01); *H04N 21/2747* (2013.01); *H04N 21/4223* (2013.01); *H04N 21/637* (2013.01); *H04N 21/6377* (2013.01); *H04N 7/18* (2013.01); *H04N 9/8211* (2013.01)

USPC ................................................... 348/207.1

(58) Field of Classification Search
CPC ............. H04N 5/765; H04N 21/2747; H04N 21/2181; H04L 29/08549

See application file for complete search history.

(56) References Cited

U.S. PATENT DOCUMENTS

| | | | | |
|---|---|---|---|---|
| 7,518,633 B2 * | 4/2009 | Horie | .......................... | 348/207.1 |
| 7,546,283 B2 * | 6/2009 | Ota | .............................. | 709/220 |
| 7,675,558 B2 * | 3/2010 | Shimizu | ................... | 348/231.99 |
| 8,442,262 B2 * | 5/2013 | Sim et al. | ....................... | 382/100 |
| 8,627,391 B2 * | 1/2014 | Lahcanski et al. | ............ | 725/105 |
| 2006/0098106 A1 * | 5/2006 | Tanaka | ..................... | 348/231.99 |
| 2008/0140945 A1 * | 6/2008 | Salessi et al. | ................ | 711/148 |

FOREIGN PATENT DOCUMENTS

| | | |
|---|---|---|
| JP | 2006-325036 A | 11/2006 |
| JP | 2009-282735 A | 12/2009 |
| KR | 10-2003-0087774 A | 11/2003 |

* cited by examiner

*Primary Examiner* — Luong T Nguyen
(74) *Attorney, Agent, or Firm* — Sughrue Mion, PLLC (57) ABSTRACT

A camera for storing photographed images in a storage device connected to the camera through a network and a method of operating the storage device of the camera. The camera includes a photographing unit photographing an object to generate image data of the object; a transfer unit transferring the image data to a storage device to store the image data therein; and a storage device setting unit transferring the image data to at least one second storage device if it is determined that the first storage device is no longer able to store the image data while the image data is being transferred to and stored in the first storage device.

19 Claims, 7 Drawing Sheets

NETWORK CAMERA AND METHOD OF OPERATING STORAGE DEVICE THEREOF

CROSS-REFERENCE TO RELATED PATENT APPLICATION

This application claims priority from Korean Patent Application No. 10-2010-0108414, filed on Nov. 2, 2010 in the Korean Intellectual Property Office, the disclosure of which is incorporated herein in its entirety by reference.

BACKGROUND

1. Field

Apparatuses and methods consistent with exemplary embodiments relate to a network camera which transmits image data to a storage device via a network.

2. Description of the Related Art

Cameras are classified as cameras for taking still images and cameras for taking moving pictures. The cameras for taking moving pictures may include closed circuit television (CCTV) cameras and network cameras.

Network cameras are connected to a storage device via a network, and store image data in the storage device. The network cameras may be installed in large buildings such as institutes, public offices, etc. or small buildings such as houses, convenience stores, banks, etc. so that locations where the network cameras are installed may be monitored in real-time by storing image data output from the network cameras in the storage device and displaying the image data on a display device.

However, if the storage device is broken, the storage device has to be replaced or managed. It takes a long time to replace and manage the storage device, and the image information may not be stored for the time during which the management or the replacement is performed. In addition, if the storage device is lack of space or network failure occurs, the image data may not be stored in the storage device.

SUMMARY

Exemplary embodiments provide a network camera capable of safely providing a storage device connected to the network camera via a network with captured images.

Exemplary embodiments also provide a method of operating storage devices that store images captured by the network camera.

According to an aspect of an exemplary embodiment, there is provided a camera that is connected to a first storage device and at least one second storage device through a network, the camera including: a photographing unit which photographs an object to generate image data of the object; a transfer unit which transfers the image data to the first storage device to store the image data therein; and a storage device setting unit which transfers the image data to the at least one second storage device if it is determined that the first storage device is no longer able to store the image data while the image data is being transferred to and stored in the first storage device.

The storage device setting unit may include an information acquiring unit which obtains information about the at least one second storage device; an operation check unit which checks at least one operating state of the at least one second storage device; and a transfer conversion unit which controls the transfer unit to transfer the image data to the at least one second storage device if it is determined that the first storage device is no longer able to store the image data while the image data is being transferred to and stored in the first storage device.

The storage device setting unit may include: an information acquiring unit which obtains information about the at least one second storage device; an operation check unit which checks at least one operating state of the at least one second storage device; and a transfer conversion unit which controls the transfer unit to transfer the image data to the at least one second storage device if it is determined that the first storage device is no longer able to store the image data while the image data is being transferred to and stored in the first storage device. The storage device setting unit may further include a comparing/selection unit, and the operation check unit may checks a plurality of operating states of a plurality of second storage devices, including the at least one second storage device. The comparing/selection unit may compare the plurality of operating states with one another, and select the at least one second storage device in an optimal state among the plurality of second storage devices.

The operation check unit may check the plurality of operating states of the plurality of second storage devices, while the image data is being transferred to and stored in the first storage device. The operation check unit may include a plurality of operation check sub-units which check the plurality of operating states of the plurality of second storage devices including the at least one second storage device.

According to an aspect of another exemplary embodiment, there is provided a method of operating a first storage device and at least one second storage device to which a camera is connected through a network, the method including: transferring image data generated at the camera to the first storage device and storing the transferred image data therein; checking at least one operating state of the at least one second storage device; and transferring the image data to the at least one second storage device if it is determined that the first storage device is no longer able to store the image data while the image data is being transferred to and stored in the first storage device.

The checking the at least one operating state of the at least one second storage device may include: periodically transmitting at least one inquiry message to the at least one second storage device; and receiving at least one response message from the at least one second storage device to check the at least one operating state of the at least one second storage device.

The method may further include: checking a plurality of operating states of a plurality of second storage devices, including the at least one second storage device; and comparing the plurality of operating states with one another and selecting the at least one second storage device in an optimal state among the plurality of second storage devices.

The checking the operating states of the plurality of second storage devices may include: periodically transmitting inquiry messages to the plurality of second storage devices; and receiving response messages from the plurality of the second storage devices to identify the operating states of the plurality of secondary storage devices.

BRIEF DESCRIPTION OF THE DRAWINGS

The above and other aspects will become more apparent by describing in detail exemplary embodiments with reference to the attached drawings, in which.

DETAILED DESCRIPTION OF EXEMPLARY EMBODIMENTS

As used herein, the term "and/or" includes any and all combinations of one or more of the associated listed items. Expressions such as "at least one of," when preceding a list of elements, modify the entire list of elements and do not modify the individual elements of the list.

The exemplary embodiments will now be described more fully with reference to the accompanying drawings. In the description of the exemplary embodiments, if it is determined that a detailed description of commonly-used technologies or structures related to the invention may unnecessarily obscure the subject matter of the invention, the detailed description will be omitted. Also, since later-described terms are defined in consideration of the functions of the exemplary embodiments, they may vary according to users' intentions or practice. Hence, the terms must be interpreted based on the contents of the entire specification.

In the drawings, lengths and sizes of layers and regions may be exaggerated for clarity, and relative sizes and ratios in drawings are exemplary, not definite. Further, when elements of the exemplary embodiments are the same as those of a related art, a detailed description thereof will be omitted.

Figure 1:
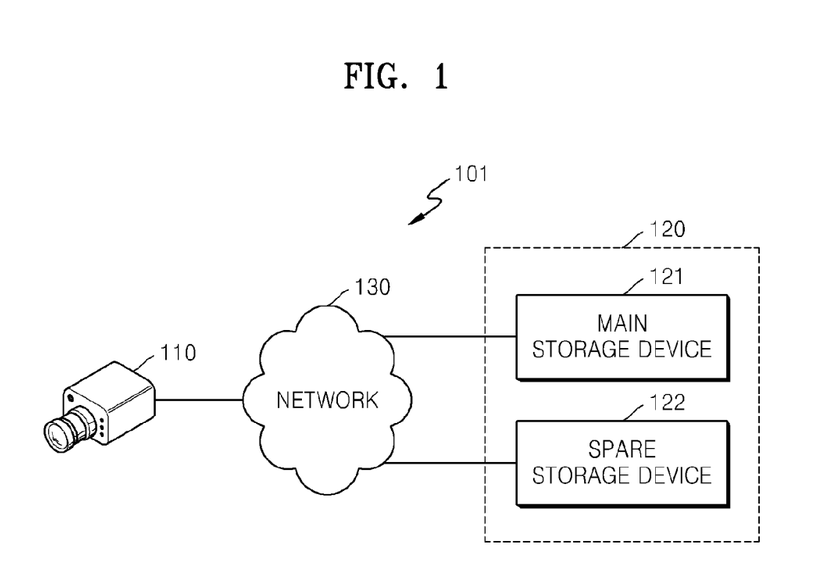
FIG. 1 is a block diagram of a network camera monitoring system according to an exemplary embodiment.

FIG. 1 is a block diagram of a network camera monitoring system 101 according to an exemplary embodiment. Referring to FIG. 1, the network camera monitoring system 101 includes a network camera 110, a storage 120 including a plurality of storage devices 121 and 122, and a network 130. According to another exemplary embodiment, the network camera monitoring system 101 may include another type of camera, such as a CCTV camera of a related art, instead of the network camera 110. The number of the monitoring camera 110 is not limited to one, and more than one camera may constitute the network camera monitoring system 101.

The network camera 110 is connected to the plurality of storage devices 121 and 122 via the network 130. The network camera 110 transmits image data that is obtained by photographing an object to one of the plurality of storage devices 121 and 122 via the network 130, in order to store the image data in one of the storage devices 121 and 122.

The plurality of storage devices 121 and 122 store data transmitted from the network camera 110. The plurality of storage devices 121 and 122 may include a main storage device 121 and a spare storage device 122. The spare storage device 122 may be all kinds of adjacent storage devices. For the main storage device 121 and the spare storage device 122, a digital video recorder (DVR) or a network video recorder (VNR) may be used. The NVR may alarm by sound or through e-mail when an event such as movement of an object, appearance of a new object, loss of an object, camera abnormality, or disconnection of the Internet occurs. The NVR may also easily search for images recorded during the time when the event occurs through intelligent searching after setting predetermined sections in a recorded image file. The images stored in the NVR may be searched for whenever and wherever, and the NVR may provide customers with desired functions, for example, a map alarm function in connection with a map and a server function. The NVR is considered as a next generation monitoring system because the NVR may be easily installed, and managed and repaired efficiently. In addition, a user may access the NVR through a network such as the Internet. The NVR receives digital images from the network camera 110, and compresses and stores the digital images. The NVR may be used as an exclusive server for recording images captured by the network camera 110 or any other devices, monitoring target places where the network camera is installed, managing events occurring in the target places, and reproducing the images captured by the network camera 110 or any other devices. Since the NVR is a network exclusive storage device, the NVR may not need a component to convert analog signals to digital signals, and thus, the NVR may replace the DVR.

The network camera 110 stores image data, received from the network camera 110 through the network 130, first in the main storage device 121. If there is a problem in the main storage device 121, the network camera 110 searches for the spare storage device 122 to store the image data in the spare storage device 122 in real-time. The network camera 110 transmits the image data to the main storage device 121 and the spare storage device 122 by using a transmission control protocol (TCP) or a reliable transmission protocol. The network camera 110 receives an acknowledge signal from the main storage device 121 when the image data is transmitted to the main storage device 121. If the acknowledge signal is not transmitted from the main storage device 121, the network camera 110 determines that there is a problem in the main storage device 121. The problem of the main storage device 121 may include a breakdown of the main storage device 121, lack of a storage space in the main storage device 121, or a network failure in the network 130 connecting the network camera 110 to the main storage device 121.

The network camera 110 may perform Internet communication, wired communication, or wireless communication with the plurality of storage devices 121 and 122. The wireless communication between the network camera 110 and the plurality of storage devices 121 and 122 may be performed by using a Bluetooth method, a ZigBee method, and a Wi-Fi method.

Figure 2:
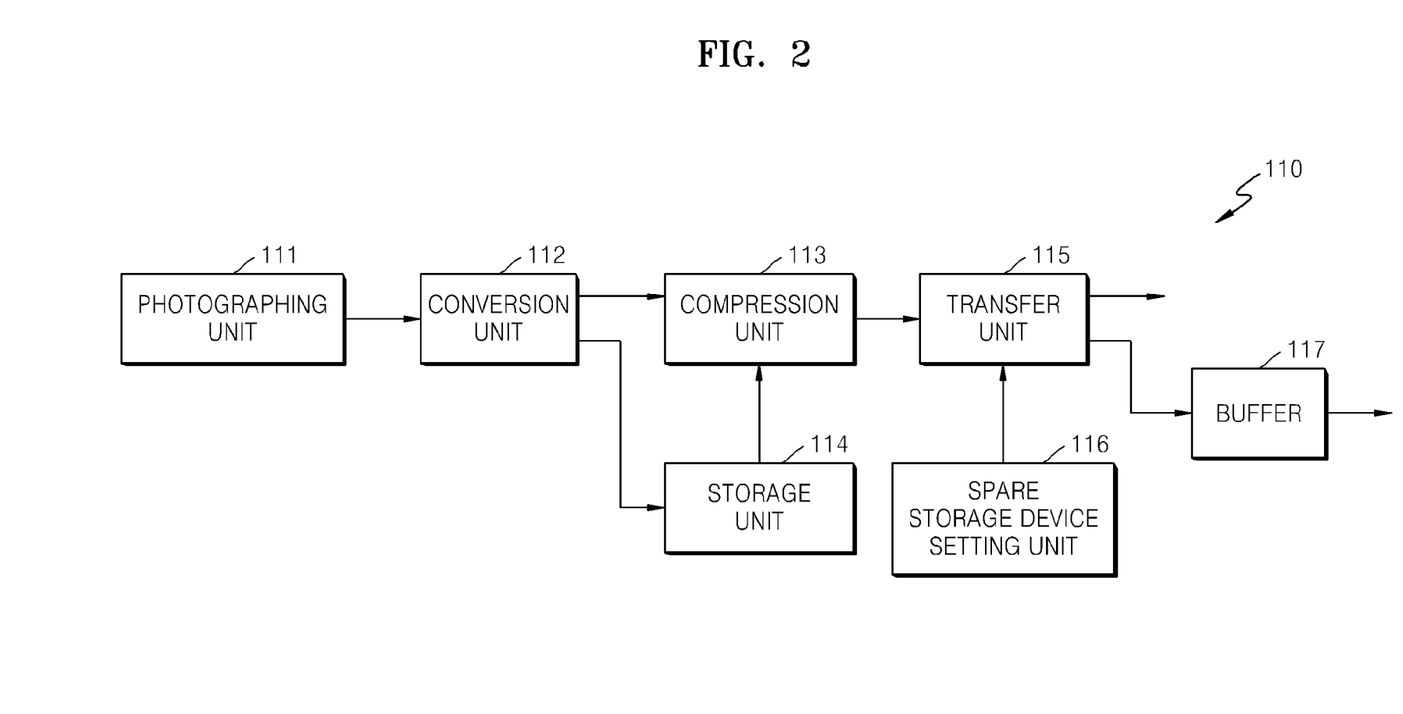
FIG. 2 is a block diagram of a network camera shown in FIG. 1, according to an exemplary embodiment.

FIG. 2 is a block diagram of the network camera 110 shown in FIG. 1, according to an exemplary embodiment. Referring to FIG. 2, the network camera 110 includes a photographing unit 111, a conversion unit 112, a compression unit 113, a storage unit 114, a transfer unit 115, a spare storage device setting unit 116, and a buffer 117. According to another exemplary embodiment, at least one of these units may be implemented in a separate device which is connected to the network camera 110. For example, the spare storage device setting unit 116 may be a device separated from the network camera 110.

The photographing unit 111 photographs an object and generates analog image data.

The conversion unit 112 converts the analog image data output from the photographing unit 111 into digital image data including information of brightness (Y) and color differences (Cb and Cr). During conversion of the analog image data into the digital image data, noise included in the image data may be removed.

The compression unit 113 compresses the digital image data output from the conversion unit 112 and outputs the compressed data. The compression unit 113 may include a moving picture experts group (MPEG) encoder or a joint photographic experts group (JPEG) encoder for compressing the digital image data. In addition, the compression unit 113 may read the digital image data stored in the storage unit 114, and then, compresses and outputs the compressed image data.

The storage unit 114 stores the digital image data output from the conversion unit 112. The storage unit 114 may include a random access memory such as a dynamic RAM (DRAM) and a programmable read only memory (PROM). The DRAM temporarily stores the digital image data, and the PROM may store algorithm that is required to process the digital image data.

The transfer unit 115 transmits the compressed digital image data output from the compression unit 113 to at least one of the plurality of storage devices 121 and 122 via the network 130.

The buffer 117 is connected to the transmission unit 115. When the main storage device 121 has a problem, the digital image data output from the transmission unit 115 is transmitted to the spare storage device 122. Here, when the storage device is switched from the main storage device 121 to the spare storage device 122, the digital image data output from the transmission unit 115 is temporarily stored in the buffer 117. The buffer 117 may be formed of an additional memory device, or may be a RAM included in the storage unit 114.

The spare storage device setting unit 116 manages the spare storage device 122. The spare storage device setting unit 116 controls the digital image data output from the transmission unit 115 to be transferred to the spare storage device 122 when the main storage device 121 has a problem.

Figure 3:
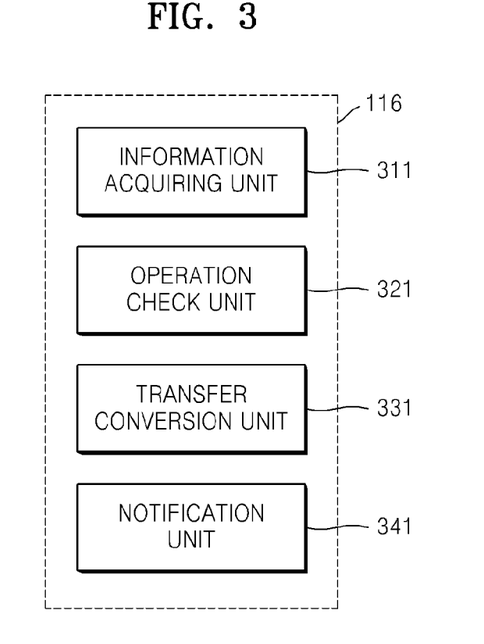
FIG. 3 is a block diagram of a spare storage device setting unit shown in FIG. 2, according to an exemplary embodiment.

FIG. 3 is a block diagram of the spare storage device setting unit 116 shown in FIG. 2, according to an exemplary embodiment. Referring to FIG. 3, the spare storage device setting unit 116 includes an information acquiring unit 311, an operation check unit 321, a transfer conversion unit 331, and a notification unit 341. The spare storage device setting unit 116 is connected to the spare storage device 122 via the network 130.

The information acquiring unit 311 communicates with the spare storage device 122 through the network 130 to obtain information about the spare storage device 122, for example, a storage capacity of the spare storage device 122, and an address (e.g., Internet protocol (IP) address) of the spare storage device 122.

The operation check unit 321 identifies an operating state of the spare storage device 122 while periodically communicating with the spare storage device 122 through the network 130. That is, the operation check unit 321 periodically transmits an inquiry message to the spare storage device 122 to check the operating state of the spare storage device 122 based on the information acquired by the information acquiring unit 311. In response to the inquiry message, the spare storage device 122 transmits a response message to the operation check unit 321, by which the operation check unit 321 determines the operating state of the spare storage device 122. If, however, the operation check unit 321 does not receive the response, the operation check unit 321 determines that the operating state of the spare storage device 122 is in an abnormal state. The response message includes information representing the operating state of the spare storage device 122. According to another exemplary embodiment, the operation check unit 321 determines that the spare storage device 122 is in a normal state only if a response message is received from the spare storage device 122. A time period from a time when the network camera 110 transmits the inquiry message to a time when the response message is received is referred to as a round trip time (RTT), that is, a band, by which a performance of the spare storage device 122 may be grasped.

The transfer conversion unit 331 transmits a signal to the transfer unit 115 so that the transfer unit 115 transmits the digital image data to the spare storage device 122, when the main storage device 121 has a problem and the digital image data may not be transmitted to the main storage device 121.

When the main storage device 121 has a problem, the notification unit 341 notifies a management system that manages the network camera monitoring system 101 of the problem. Here, the notification unit 341 informs the management system of a time when the problem occurred in the main storage device 121, a location of the problem in the main storage device 121, and the change of a storage device for storing the image data. The management system may be a server connected to the network 130. As described above, a user may identify accurately where the image data generated by the network camera 110 is stored through the management system, and may grasp causes of the problem rapidly.

According to an exemplary embodiment, the network camera 110 may obtain not only the image data but also audio data through the photographing unit 111 to store the image data and the audio data in the main storage device 121 and/or the spare storage device 122.

Figure 4:
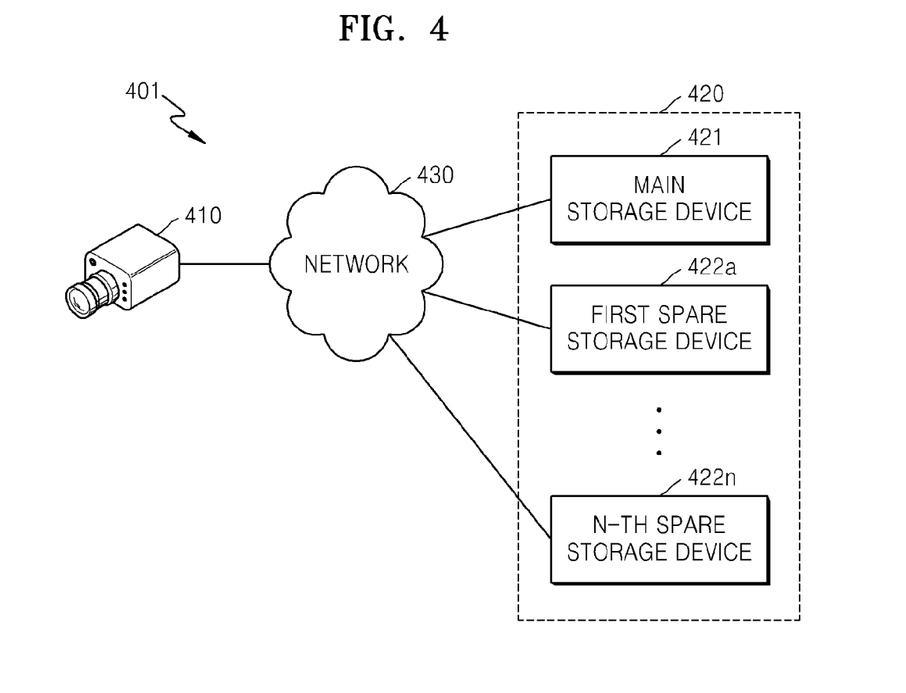
FIG. 4 is a block diagram of a network camera monitoring system according to another exemplary embodiment.

FIG. 4 is a block diagram of a network camera monitoring system 401 according to another exemplary embodiment. Referring to FIG. 4, the network camera monitoring system 401 includes a network camera 410, a network 430, and a storage device 420 including a plurality of storage devices 421, and 422a through 422n.

The network camera 410 is connected to the plurality of storage devices 421, and 422a through 422n via the network 430. The network camera 410 transfers image data that is generated by photographing an object to one of the plurality of storage devices 421, and 422a through 422n through the network 430 to store the image data.

The plurality of storage devices 421, and 422a through 422n store the image data transmitted from the network camera 410. The plurality of storage devices 421, and 422a through 422n may include a main storage device 421, and a plurality of spare storage devices 422a through 422n. The plurality of spare storage devices 422a through 422n may be all kinds of storage devices.

The main storage device 421 and the plurality of spare storage devices 422a through 422n may be respectively formed of a DVR or an NVR as described earlier.

The network camera 410 stores image data, received from the network camera 110 through the network 130, first in the main storage device 421. If there is a problem in the main storage device 421, the network camera 410 selects at least one optimal spare storage device among the plurality of spare storage devices 422a through 422n to store the image data in the selected spare storage device in real-time. The network camera 410 transmits the image data to the main storage device 421 and the spare storage devices 422a through 422n by using a TCP or a reliable transmission protocol. The network camera 410 receives an acknowledge signal from the main storage device 421 when the image data is transmitted to the main storage device 421. If the acknowledge signal is not transmitted from the main storage device 421, the network camera 410 determines that there is a problem in the main storage device 421.

The network camera 410 may perform Internet communication, wired communication, or wireless communication with the plurality of storage devices 421 and 422a through 422n. The wireless communication between the network camera 410 and the plurality of storage devices 421, and 422a through 422n may be performed by using a Bluetooth method, a ZigBee method, and a Wi-Fi method.

Figure 5:
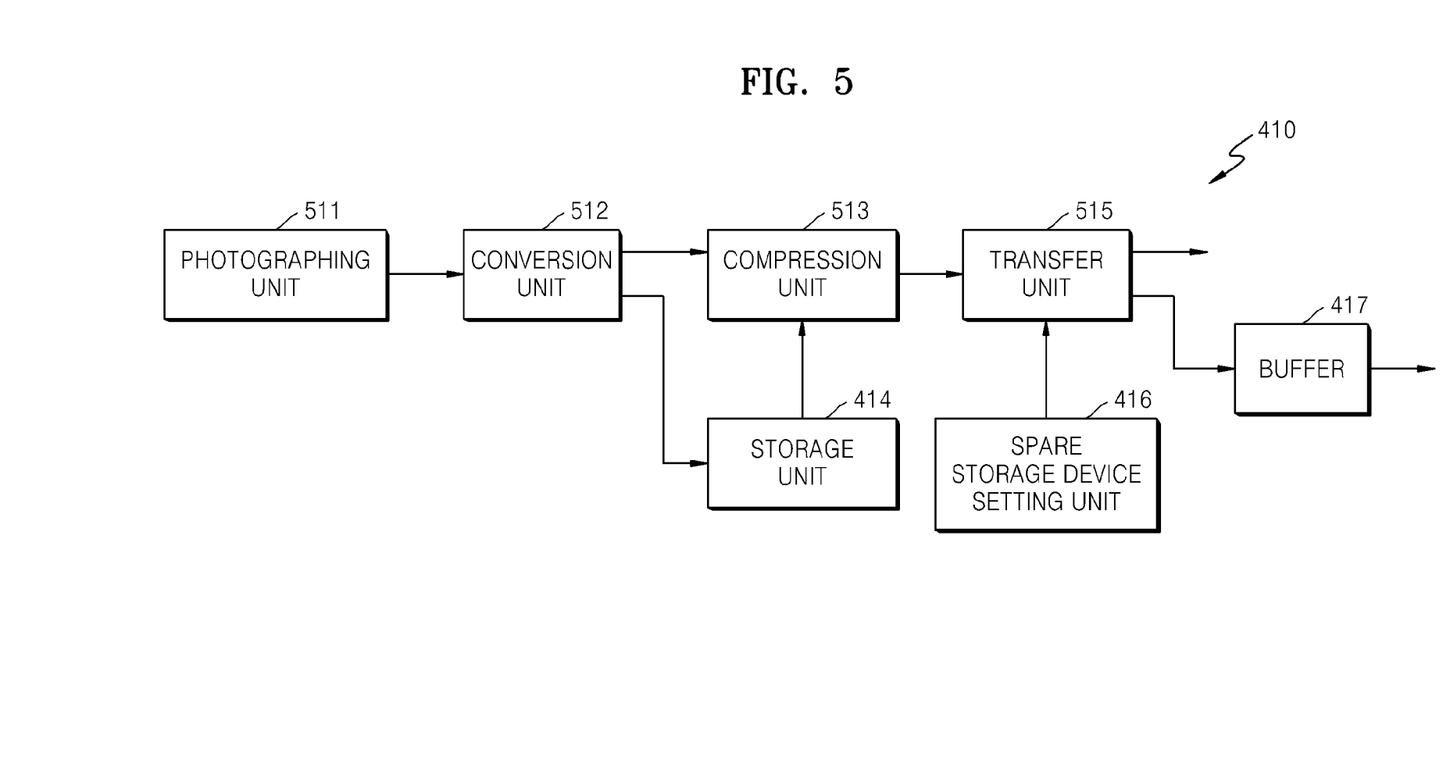
FIG. 5 is a block diagram of a network camera shown in FIG. 4, according to an exemplary embodiment.

FIG. 5 is a block diagram of the network camera 410 shown in FIG. 4, according to an exemplary embodiment. Referring to FIG. 5, the network camera 410 includes a photographing unit 411, a conversion unit 412, a compression unit 413, a storage unit 414, a transfer unit 415, a spare storage device setting unit 416, and a buffer 417. According to another exemplary embodiment, at least one of these units may be implemented in a separate device which is connected to the network camera 410. For example, the spare storage device setting unit 416 may be a device separated from the network camera 110.

The photographing unit 411 photographs an object and generates analog image data.

The conversion unit 412 converts the analog image data output from the photographing unit 411 into digital image data including information of brightness (Y) and color differences (Cb and Cr). During conversion of the analog image data into the digital image data, noise included in the image data may be removed.

The compression unit 413 compresses the digital image data output from the conversion unit 412 and outputs the compressed data. The compression unit 413 may include an MPEG encoder or a JPEG encoder for compressing the digital image data. In addition, the compression unit 413 may read the digital image data stored in the storage unit 414, and then, compresses and outputs the compressed image data.

The storage unit 414 stores the digital image data output from the conversion unit 412. The storage unit 414 may include a DRAM and a PROM. The DRAM temporarily stores the digital image data, and the PROM may store algorithm that is required to process the digital image data.

The transfer unit 415 transmits the compressed digital image data output from the compression unit 413 to at least one of the plurality of storage devices 421, and 422a through 422n via the network 430.

The buffer 417 is connected to the transfer unit 415. When the main storage device 421 has a problem, the digital image data output from the transfer unit 415 is transmitted to one of the spare storage devices 422a through 422n. Here, when the storage device is switched from the main storage device 421 to one of the spare storage devices 422a through 422n, the digital image data output from the transfer unit 415 is temporarily stored in the buffer 417. The buffer 417 may be formed of an additional memory device, or may be a RAM included in the storage unit 414.

The spare storage device setting unit 416 manages the plurality of spare storage devices 422a through 422n. The spare storage device setting unit 416 controls the digital image data output from the transfer unit 415 to be transferred to one of the spare storage devices 422a through 422n when the main storage device 421 has a problem.

Figure 6:
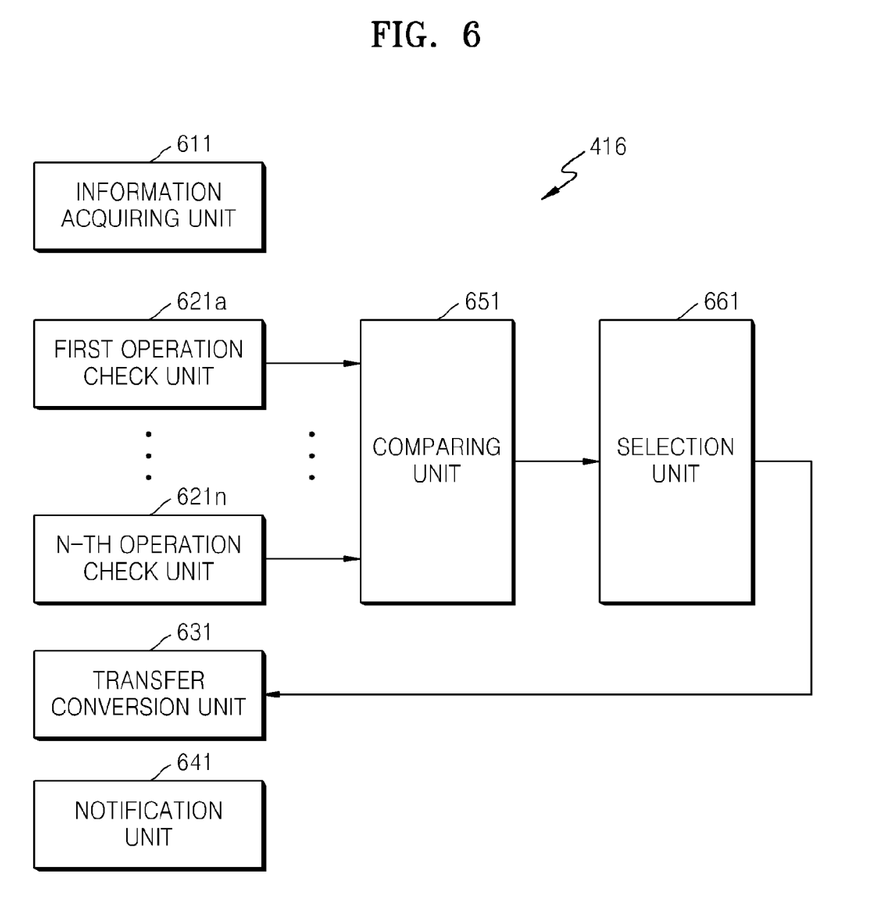
FIG. 6 is a block diagram of a spare storage device setting unit shown in FIG. 5, according to an exemplary embodiment.

FIG. 6 is a block diagram of the spare storage device setting unit 416 shown in FIG. 5, according to an exemplary embodiment. Referring to FIG. 6, the spare storage device setting unit 416 includes an information acquiring unit 611, a plurality of operation check units 621a through 621n, that is, a first operation check unit 621a through an N-th operation check unit 621n, a comparing unit 651, a selection unit 661, a transfer conversion unit 631, and a notification unit 641. The spare storage device setting unit 416 is connected to the plurality of spare storage devices 422a through 422n via the network 430.

The information acquiring unit 611 communicates with the spare storage devices 422a through 422n via the network 430 to obtain information about the plurality of spare storage devices 422a through 422n, for example, storage capacities of the spare storage devices 422a through 422n, and addresses (e.g., IP addresses) of the spare storage devices 422a through 422n.

The plurality of operation check units 621a through 621n communicate respectively with the spare storage devices 422a through 422n via the network 430 in one to one correspondence to check operating states of the spare storage devices 422a through 422n, respectively. That is, the operation check units 621a through 621n periodically transmit inquiry messages to the spare storage devices 422a through 422n to check the operating states of the spare storage devices 422a through 422n, respectively, based on the information acquired by the information acquiring unit 611. In response to the inquiry messages, the spare storage devices 422a through 422n transmit response messages to the operation check units 621a through 621n, respectively, by which the operation check units 621a through 621n determine that the operating states of the spare storage devices 422a through 422n, respectively. If, however, the operation check units 621a through 621n do not receive the response messages, the operation check units 621a through 621n determine that the operating states of the spare storage devices 422a through 422n are in abnormal states, respectively. The response messages include information representing the operating states of the spare storage devices 422a through 422n, respectively. According to another exemplary embodiment, the operation check units 621a through 621n determine that the spare storage devices 422a through 422n are in normal states only if response messages are received from the spare storage devices 422a through 422n, respectively. Here, RTTs, that is, bands of each the spare storage devices 422a through 422n may be different from one another. In addition, it may be determined that the shorter the band is, the higher the performance of a spare storage device is.

The comparing unit 651 receives the bands of the spare storage devices 422a through 422n from the operation check units 621a through 621n, and compares the bands with one another. That is, the comparing unit 651 compares the bands of the spare storage devices 422a through 422n, and outputs a result of the comparison.

The selection unit 661 receives the result of the comparison from the comparing unit 651 and selects an optimal spare storage device among the spare storage devices 422a through 422n, and then, transmits a result of the selection to the transfer conversion unit 631.

The transfer conversion unit 631 transmits a signal to the transfer unit 415 (refer to FIG. 5) so that the transfer unit 415 transmits the digital image data to the spare storage device in the optimal state, when the main storage device 421 (refer to FIG. 4) has a problem and the digital image data may not be transmitted to the main storage device 421. The transfer conversion unit 631 may recognize which one is the optimal spare storage device from the selection unit 661.

When the main storage device 421 has a problem, the notification unit 641 notifies a management system that manages the network camera monitoring system 401 of the problem. The management system may be a server connected to the network 430. Here, the notification unit 641 informs the management system of a time when the problem occurred in the main storage device 421, the data storing space, and the change of a storage device for storing the image data. As described above, a user may identify accurately where the image data generated by the network camera 410 is stored through the management system, and may grasp causes of the problem rapidly.

According an exemplary embodiment, the network camera 410 may obtain not only the image data but also audio data through the photographing unit 511 to store the image data and the audio data in the main storage device 421 and/or the optimal spare storage device among the spare storage devices 422a through 422n. According to an exemplary embodiment, the selection unit 661 may select more than one optimal spare storage device to store the image data when the main storage device 421 has the problem.

Figure 7:
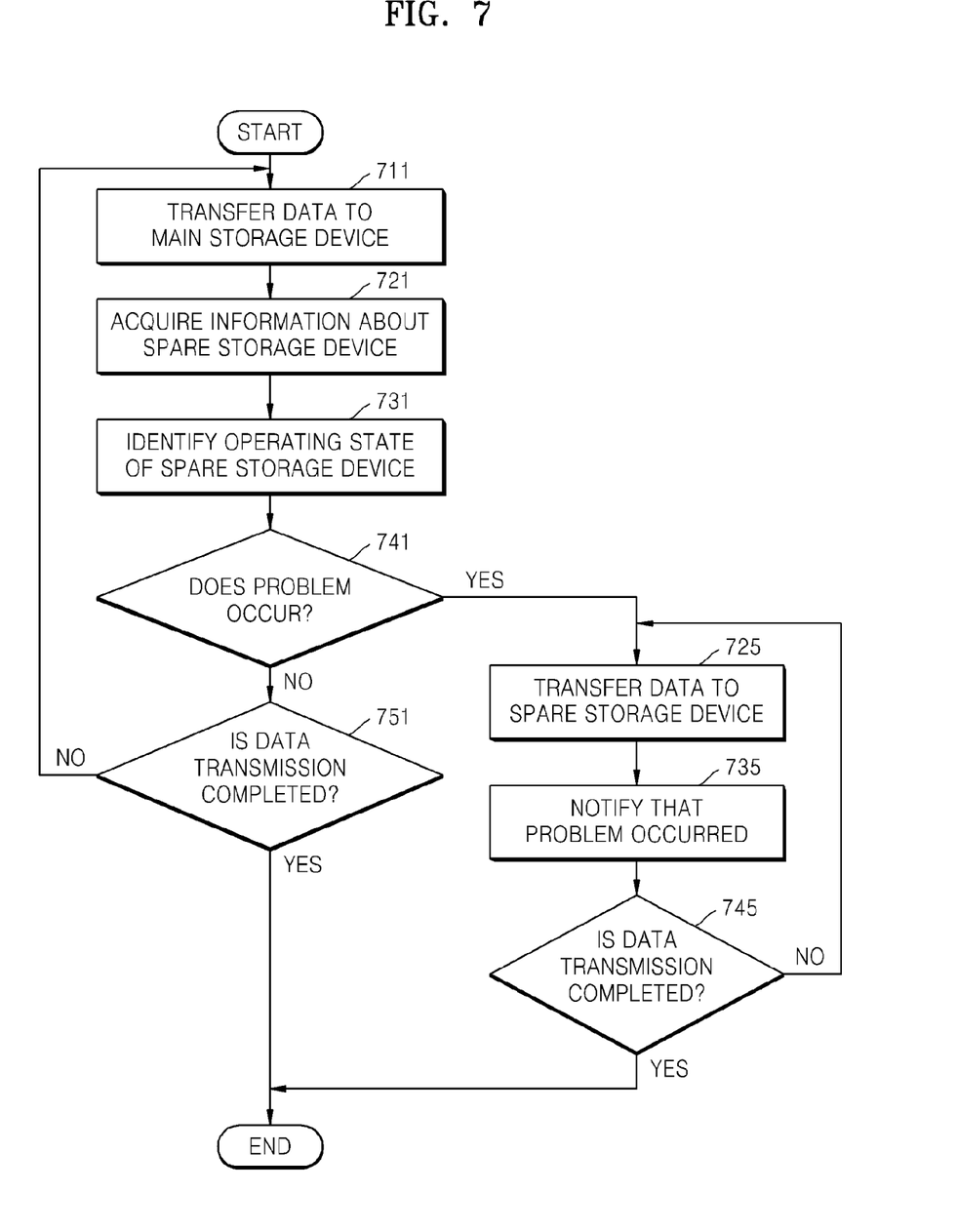
FIG. 7 is a flowchart illustrating a method of operating the network camera monitoring system 101 as shown in FIG. 1, according to an exemplary embodiment.

FIG. 7 is a flowchart illustrating a method of operating the network camera monitoring system 101 as shown in FIG. 1, according to an exemplary embodiment. Referring to FIG. 7, the method which includes operations 711 through 731 will be described with reference to FIGS. 1 through 3.

In operation 711, the network camera 110 transfers image data to the main storage device 121. The network camera 110 transfers the image data that is generated by photographing an object first in the main storage device 121 to store the image data therein.

In operation 721, the network camera 110 acquires information about the spare storage device 122. That is, the network camera 110 transmits a signal to the spare storage device 122 while communicating with the main storage device 121 to acquire information relating to the spare storage device 122, for example, a storage capacity and an address of the spare storage device 122.

In operation 731, the network camera 110 checks an operating state of the spare storage device 122. That is, the network camera 110 transmits an inquiry message to the spare storage device 122, and receives a response message from the spare storage device 122 to identify the operating state of the spare storage device 122. The response message includes the information about the operating state of the spare storage device.

In operation 741, the network camera 110 determines if a problem has occurred in the main storage device 121. In operation 751, the network camera 110 determines if transmission of the image data is completed, if it is determined in operation 741 that the problem has not occurred in the main storage device 121. The network camera 110 repeatedly performs operations 711, 721, 731, 741 and 751 until transmission of the image data to the main storage device 121 is completed.

During the transmission of the image data from the network camera 110 to the main storage device 121, a problem may occur in the main storage device 121. If there is no problem in the main storage device 121, the network camera 110 continuously performs the operations 711 through 731. However, if the problem occurs in the main storage device 121, the network camera 110 transfers the image data to the spare storage device 122 to store the image data therein (operation 725). Since the information and the operating state of the spare storage device 122 are already identified in operations 721 and 731, the image data may be transferred to the spare storage device 122 and stored therein without a loss.

In addition, the network camera 110 notifies the management system that manages the network camera 110 of that the problem has occurred in the main storage device 121 (operation 735).

In operation 745, the network camera 110 determines again if transmission of the image data is completed. The network camera 110 repeatedly performs operations 725, 735 and 745 until transmission of the image data to the spare storage device 122 is completed. Through the above operations, the network camera 110 may store the image data without a loss.

In the present exemplary embodiment, operations 721, 731 and 741 are performed in this order. However, the inventive concept does not limit the method of operating the network camera monitoring system 101 only to this order. Various different combinations of these operations may be implemented by one of ordinary skill in the art. For example, operations 721 and 731 may be performed after operation 741. Also, operations 711, 721 and 731 may change with respect to one another.

Figure 8:
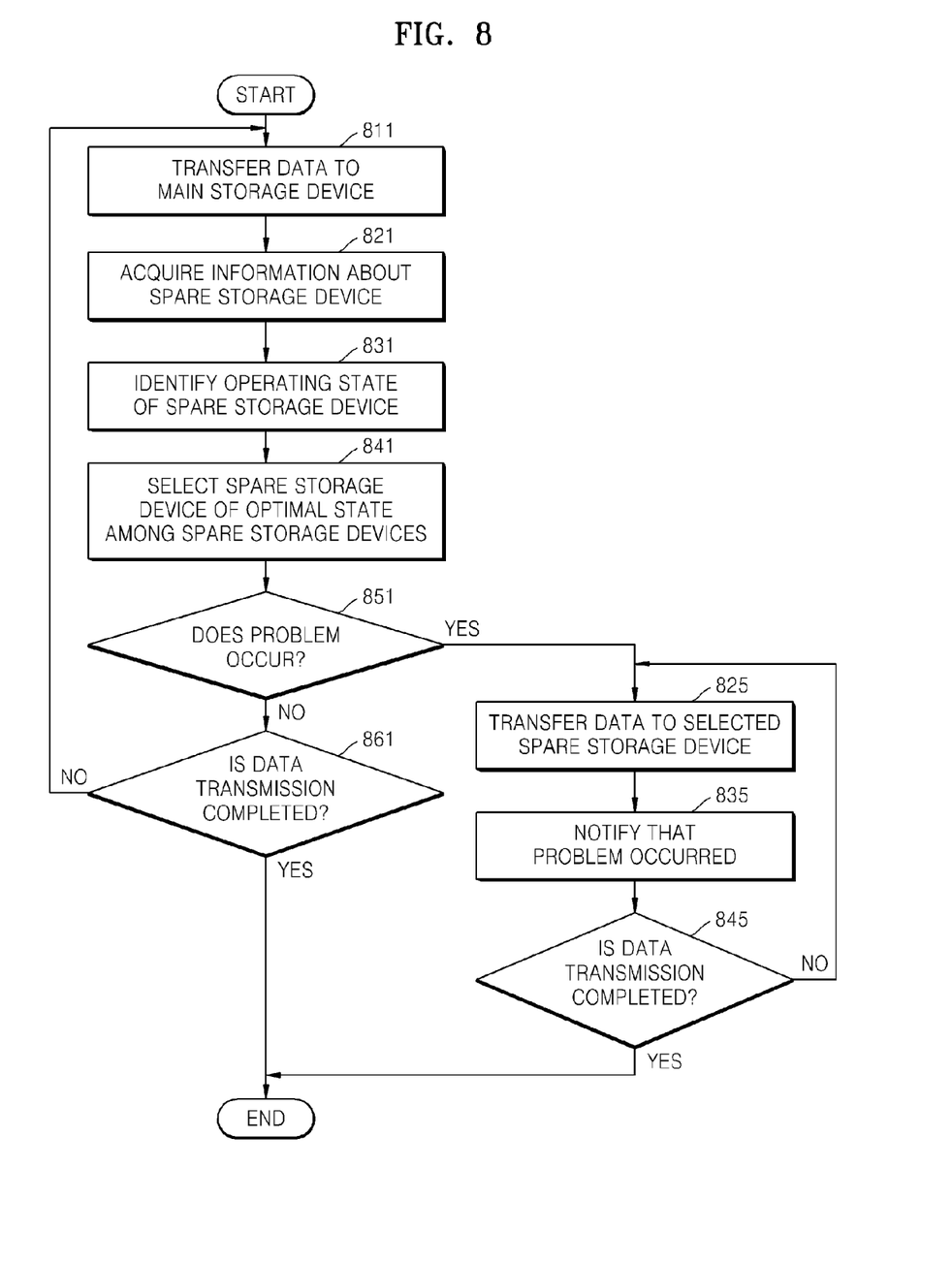
FIG. 8 is a flowchart illustrating a method of operating the network camera monitoring system 401 as shown in FIG. 4, according to another exemplary embodiment.

FIG. 8 is a flowchart illustrating a method of operating the network camera monitoring system 401, according to an exemplary embodiment. Referring to FIG. 8, the method which includes operations 811 through 841 will be described with reference to FIGS. 4 through 6.

In operation 811, the network camera 410 transfers image data to the main storage device 421. The network camera 410 transfers the image data that is generated by photographing an object to the main storage device 421 to store the image data therein.

In operation 821, the network camera 410 acquires information about the spare storage devices 422a through 422n. That is, the network camera 410 transmits signals to the spare storage devices 422a through 422n while communicating with the main storage device 421 to acquire information relating to the spare storage devices 422a through 422n, for example, storage capacities and addresses of the spare storage devices 422a through 422n, respectively.

In operation 831, the network camera 410 checks operating states of the spare storage devices 422a through 422n. That is, the network camera 410 transmits inquiry messages to the spare storage devices 422a through 422n, and receives response messages from the spare storage devices 422a through 422n to identify the operating states of the spare storage devices 422a through 422n, respectively. The response messages include the information about the operating states of the plurality of spare storage devices 422a through 422n, respectively.

In operation 841, the network camera 410 compares bands of the spare storage devices 422a through 422n included in the response messages, and selects one spare storage device in an optimal state.

In operation 851, the network camera 110 determines if a problem has occurred in the main storage device 121. In operation 861, the network camera 410 determines if transmission of the image data is completed, if it is determined in operation 851 that the problem has not occurred in the main storage device 421. The network camera 410 repeatedly performs operations 811, 831, 841, 851 and 861 until the transmission of the image data to the main storage device 421 is completed.

During the transmission of the image data from the network camera 410 to the main storage device 421, a problem may occur in the main storage device 421. If there is no problem in the main storage device 421, the network camera 410 continuously performs the operations 811 through 841. However, if the problem occurs in the main storage device 421, the network camera 410 transfers the image data to the optimal spare storage device among the plurality of spare storage devices 422a through 422n to store the image data therein (operation 825). Since the optimal spare storage device is selected by checking the information and the operating states of the spare storage devices 422a through 422n in operations 821 through 841, the image data may be transferred to the optimal spare storage device in the optimal state and stored therein without a loss.

In addition, the network camera 410 notifies the management system that manages the network camera 410 of that the problem has occurred in the main storage device 421 (operation 835).

In operation 845, the network camera 410 determines again if transmission of the image data is completed. The network camera 410 repeatedly performs operations 825, 835 and 845 until transmission of the image data to the optimal spare storage device is completed. Through the above operations, the network camera 410 may store the image data without a loss.

In the present exemplary embodiment, operations 811, 821, 831, 841 and 851 are performed in this order. However, the inventive concept does not limit the method of operating the network camera monitoring system 401 only to this particular order. Various different combinations of these operations may be implemented by one of ordinary skill in the art. For example, operations 821, 831 and 841 may be performed after operation 851. Also, operations 811, 821, 831 and 841 may change with respect to one another.

The storage devices 120 and 420 according to the exemplary embodiments may be used to search for schedules and data stored in the plurality of storage devices included therein, provide the network camera monitoring systems 101 and 401 with stabilized management environment, and backup disaster data, respectively.

The exemplary embodiments may be applied to an image managing center and cloud computing having a network environment.

According to the exemplary embodiments, a network camera primarily stores image data in a main storage device, and if there is a problem in the main storage device, for example, when the main storage device is broken, the main storage device is lack of a storage space, or a network failure occurs, the network camera stores the image data in a spare storage device after checking an operating state of the spare storage device. Therefore, the image data may be stored safely without a loss.

The term "unit" as used herein means a hardware component, such as a processor or circuit, and/or a software component that is executed by a hardware component such as a processor. Also, two or more of a plurality of units described in the exemplary embodiments may be implemented as a single unit for structural simplicity. For example, the comparing unit 651 and the selection unit 661 of the storage device setting unit 416 as shown in FIGS. 5 and 6 may be combined to one single unit. Also, the first operation check unit 621a through the N-th operation check unit 621n of the storage device setting unit 416 may be combined to one single unit.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A camera connected to a first storage device and at least one second storage device through a network comprising:
   a photographing unit which photographs an object to generate image data of the object;
   a transfer unit which transfers the image data to the first storage device to store the image data therein; and
   a storage device setting unit which transfers the image data to the at least one second storage device if it is determined that the first storage device is no longer able to store the image data while the image data is being transferred to and stored in the first storage device,
   wherein the storage device setting unit comprises an operation check unit which periodically transmits at least one inquiry message to the at least one second storage device, and receives at least one response message from the at least one second storage device to identify at least one operating state of the at least one second storage device, while the image data is being transferred to and stored in the first storage device.

2. The camera of claim 1, wherein the storage device setting unit comprises:
   an information acquiring unit which obtains information about the at least one second storage device; and
   a transfer conversion unit which controls the transfer unit to transfer the image data to the at least one second storage device if it is determined that the first storage device is no longer able to store the image data while the image data is being transferred to and stored in the first storage device.

3. The camera of claim 1, wherein the storage device setting unit comprises an information acquiring unit which obtains information about the at least one second storage device, and
   wherein the information that the information acquiring unit acquires comprises information about a storage capacity and an Internet protocol (IP) address of the at least one second storage device.

4. The camera of claim 1, wherein the storage device setting unit further comprises a transfer conversion unit which controls the transfer unit to transfer the image data to the at least one second storage device based on the identified at least one operating state of the at least one second storage device, if it is determined that the first storage device is no longer able to store the image data while the image data is being transferred to and stored in the first storage device.

5. A camera connected to a first storage device and a plurality of second storage device through a network comprising:
   a photographing unit which photographs an object to generate image data of the object;
   a transfer unit which transfers the image data to the first storage device to store the image data therein; and
   a storage device setting unit which transfers the image data to the at least one second storage device if it is determined that the first storage device is no longer able to store the image data while the image data is being transferred to and stored in the first storage device,
   wherein the storage device setting unit comprises:
   an operation check unit which checks a plurality of operating states of a plurality of second storage devices including the at least one second storage device; and
   a comparing and selection unit which compares the plurality of operating states with one another, and selects the at least one second storage device in an optimal state among the plurality of second storage devices based on the checked plurality of operating states of the plurality of second storage devices.

6. The camera of claim 5, wherein the operation check unit checks the plurality of operating states of the plurality of second storage devices, and the comparing and selection unit compares the plurality of operating states with one another and selects the at least one second storage device in the optimal state among the plurality of second storage devices, while the image data is being transferred to and stored in the first storage device.

7. The camera of claim 5, wherein the operation check unit comprises a plurality of operation check sub-units which check the plurality of operating states of the plurality of second storage devices including the at least one second storage device.

8. The camera of claim 5, wherein the storage device setting unit further comprises an information acquiring unit which acquires information about a storage capacity and an Internet protocol (IP) address of each of the plurality of second storage devices.

9. The camera of claim 5, wherein the operation check unit periodically transmits inquiry messages to the plurality of second storage devices, and receives response messages from the plurality of second storage devices to identify the operating states of the plurality of second storage devices.

10. The camera of claim 9, wherein the comparing and selection unit selects the at least one second storage device in the optimal state among the plurality of second storage devices, based on a time period from a time when each of the inquiry messages is transmitted and to a time when each of the response messages is received.

11. The camera of claim 1, wherein the photographing unit further obtains audio related to the object to generate audio data along with the image data,
wherein the transfer unit transfers both the image data and the audio data to the first storage device to store the image data and the audio data, and
wherein the storage device setting unit transfers the image data and the audio data to the at least one second storage device if it is determined that the first storage device is no longer able to store the image data and the audio data while the image data and the audio data are being transferred to and stored in the first storage device.

12. The camera of claim 1, wherein it is determined that the first storage device is no longer able to store the image data while the image data is being transferred to and stored in the first storage device, due to at least one of breakdown of the first storage device and a failure in the network.

13. A method of operating a first storage device and at least one second storage device to which a camera is connected through a network, the method comprising:
transferring image data generated at the camera to the first storage device and storing the transferred image data therein;
checking at least one operating state of the at least one second storage device; and
transferring the image data to the at least one second storage device if it is determined that the first storage device is no longer able to store the image data while the image data is being transferred to and stored in the first storage device,
wherein the checking the at least one operating state of the at least one second storage device comprises:
periodically transmitting at least one inquiry message to the at least one second storage device; and
receiving at least one response message from the at least one second storage device to check the at least one operating state of the at least one second storage device.

14. The method of claim 13, further comprising checking the at least one operating state of the at least one second storage device while the image data is being transferred to and stored in the first storage device.

15. The method of claim 14, wherein the transferring the image data to the at least one second storage device is performed based on a result of the checking the at least one operating state of the at least one second storage device.

16. A method of operating a first storage device and a plurality of second storage device to which a camera is connected through a network, the method comprising:
transferring image data generated at the camera to the first storage device and storing the transferred image data therein;
checking a plurality of operating states of a plurality of second storage devices, including the at least one second storage device; and
comparing the plurality of operating states with one another and selecting the at least one second storage device in an optimal state among the plurality of second storage devices; and
transferring the image data to the at least one second storage device if it is determined that the first storage device is no longer able to store the image data while the image data is being transferred to and stored in the first storage device.

17. The method of claim 16, wherein the checking the operating states of the plurality of second storage devices comprises:
periodically transmitting inquiry messages to the plurality of second storage devices; and
receiving response messages from the plurality of the second storage devices to identify the operating states of the plurality of secondary storage devices.

18. The method of claim 17, wherein the at least one second storage device in the optimal state is selected among the plurality of second storage devices, based on a time period from a time when each of the inquiry messages is transmitted and to a time when each of the response messages is received.

19. An apparatus to control a camera connected to a first storage device and at least one second storage device through a network comprising:
a transfer unit which transfers image data captured by a camera to the first storage device to store the image data therein;
a storage device setting unit which transfers the image data to the at least one second storage device if it is determined that the first storage device is no longer able to store the image data while the image data is being transferred to and stored in the first storage device;
an operation check unit which checks a plurality of operating states of a plurality of second storage devices including the at least one second storage device, while the image data is being transferred to and stored in the first storage device; and
a comparing and selection unit which compares the plurality of operating states with one another and selects the at least one second storage device in an optimal state among the plurality of second storage devices based on the checked plurality of operating states of the plurality of second storage devices, while the image data is being transferred to and stored in the first storage device.

* * * * *